(12) United States Patent
Oohama

(10) Patent No.: US 11,598,406 B2
(45) Date of Patent: Mar. 7, 2023

(54) PHASE ADJUSTMENT SYSTEM FOR GEARED COMPRESSOR, PHASE ADJUSTMENT JIG FOR GEARED COMPRESSOR, AND METHOD FOR ADJUSTING PHASE OF GEARED COMPRESSOR

(71) Applicant: MITSUBISHI HEAVY INDUSTRIES COMPRESSOR CORPORATION, Tokyo (JP)

(72) Inventor: Seiji Oohama, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 512 days.

(21) Appl. No.: 16/791,229

(22) Filed: Feb. 14, 2020

(65) Prior Publication Data

US 2020/0271211 A1   Aug. 27, 2020

(30) Foreign Application Priority Data

Feb. 22, 2019   (JP) .............................. JP2019-030689

(51) Int. Cl.
*F16H 57/023*   (2012.01)

(52) U.S. Cl.
CPC ...... *F16H 57/023* (2013.01); *F05B 2230/608* (2013.01); *F05B 2260/4031* (2013.01); *F16H 2306/48* (2013.01)

(58) Field of Classification Search
CPC ............... F16H 57/023; F16H 2306/48; F05B 2230/608; F05B 2260/4031; F01D 25/285; F05D 2230/644; F05D 2230/68; F04D 29/624; F04D 25/163
See application file for complete search history.

(56) References Cited

U.S. PATENT DOCUMENTS

| 2,508,539 | A | * | 5/1950 | Reck | ..................... | B23D 21/145 |
| | | | | | | 30/107 |
| 2011/0305558 | A1 | * | 12/2011 | Omori | ................... | F04D 25/163 |
| | | | | | | 415/122.1 |
| 2012/0014788 | A1 | * | 1/2012 | Blair | ..................... | F04D 29/444 |
| | | | | | | 415/208.2 |

(Continued)

FOREIGN PATENT DOCUMENTS

| CN | 2218059 Y | * | 1/1996 |
| EP | 0704624 A1 | * | 4/1996 |

(Continued)

*Primary Examiner* — Justin Holmes
(74) *Attorney, Agent, or Firm* — Osha Bergman Watanabe & Burton LLP

(57) ABSTRACT

A phase adjustment system 100 for a geared compressor 1 includes a phase adjustment jig 50 that is to be detachably provided in the geared compressor 1. The geared compressor 1 includes a drive gear 4 fixed to a drive shaft and having a largest outer diameter among a plurality of gears; a driven gear having a smaller diameter than a diameter of the drive gear 4 and meshing with the drive gear 4; and a gear casing accommodating the drive gear 4 and the driven gear. The phase adjustment jig 50 includes a fifth jig gear 66 that meshes with the drive gear 4 in a state where a frame 51 is fixed to the gear casing; and a manually rotatable handle 70 that is configured to rotate the fifth jig gear 66.

6 Claims, 9 Drawing Sheets

(56) References Cited

U.S. PATENT DOCUMENTS

| | | |
|---|---|---|
| 2016/0108760 A1 | 4/2016 | Yamada |
| 2018/0058468 A1 | 3/2018 | Yanagisawa et al. |
| 2018/0283389 A1 | 10/2018 | Fujioka |

FOREIGN PATENT DOCUMENTS

| | | | | |
|---|---|---|---|---|
| GB | 2025291 A | * | 1/1980 | ............. B25B 13/46 |
| JP | S53-037207 A | | 4/1978 | |
| JP | S59-003105 A | | 1/1984 | |
| JP | H09-119487 A | | 5/1997 | |
| JP | 2013-522565 A | | 6/2013 | |
| JP | 2016-191311 A | | 11/2016 | |
| JP | 6058167 B2 | | 1/2017 | |
| JP | 2017-048719 A | | 3/2017 | |
| JP | 6266406 B2 | | 1/2018 | |
| WO | 2011/115915 A1 | | 9/2011 | |

* cited by examiner

PHASE ADJUSTMENT SYSTEM FOR GEARED COMPRESSOR, PHASE ADJUSTMENT JIG FOR GEARED COMPRESSOR, AND METHOD FOR ADJUSTING PHASE OF GEARED COMPRESSOR

BACKGROUND OF THE INVENTION

Field of the Invention

The present invention relates to a phase adjustment system for a geared compressor, a phase adjustment jig for a geared compressor, and a method for adjusting the phase of a geared compressor.

Priority is claimed on Japanese Patent Application No. 2019-030689, filed on Feb. 22, 2019, the content of which is incorporated herein by reference.

Description of Related Art

A centrifugal compressor which is a rotary machine compresses gas by allowing the gas to pass through a rotating impeller in a radial direction and using a centrifugal force generated at that time.

For example, as one type of such centrifugal compressor, Japanese Unexamined Patent Application, First Publication No. 2016-191311 discloses a geared compressor including a gear that is rotated by a driving source, a pinion that meshes with the gear and is fixed to a pinion shaft, and impellers that are provided in both end portions of the pinion shaft.

SUMMARY OF THE INVENTION

In such geared compressor, when maintenance or the like is performed, the position (phase) of a rotating system such as the gear and the pinion in a circumferential direction around the axis of the rotating system may have to be adjusted. However, when maintenance is performed, the driving source which rotates the gear stops, and the gear or the pinion is not rotatable as it is. Particularly, in a case where the geared compressor is large, the weight of the rotating system including the gear, the pinion, the pinion shaft, and the impellers is very large. For this reason, a large torque is required to rotate the rotating system of the geared compressor, and it is very difficult to adjust the phase of the rotating system with high accuracy.

The present invention provides a phase adjustment system for a geared compressor, a phase adjustment jig for a geared compressor, and a method for adjusting the phase of a geared compressor which are capable of adjusting the phase of a rotating system easily and with high accuracy.

According to a first aspect of the present invention, there is provided a phase adjustment system for a geared compressor including a geared compressor including gears that are provided to mesh with each other; and a phase adjustment jig configured to be attachable to and detachable from the geared compressor and to adjust phases of the gears, in which the geared compressor includes a rotation drive portion, a drive shaft configured to be rotated by the rotation drive portion, a drive gear fixed to the drive shaft and having a largest outer diameter among the gears, a driven gear having a smaller diameter than a diameter of the drive gear among the gears and meshing with the drive gear, a gear casing accommodating the drive gear and the driven gear, a driven shaft fixed to the driven gear, and a compression portion provided in an end portion of the driven shaft and configured to rotate together with the driven shaft to compress a fluid, and in which the phase adjustment jig includes a frame that is attachable to and detachable from the gear casing, a main jig gear that is rotatably provided with respect to the frame and meshes with the drive gear in a state where the frame is fixed to the gear casing, and a handle is configure to rotate the main jig gear.

With such configuration, the frame is fixed to the gear casing, and thus, the main jig gear meshes with the drive gear. In this state, the rotation of the main jig gear is transmitted by rotating the main jig gear with the handle; and thereby being able to rotate the drive gear. The drive gear rotates, and thereby being able to rotate the rotating system of the geared compressor. Therefore, it is possible to adjust the phase of the rotating system of the geared compressor with the handle. Furthermore, the main jig gear meshes with the drive gear with the largest outer diameter. With such configuration, it is possible to rotate the rotating system of the geared compressor with smaller torque. Therefore, it is possible to adjust the phase of the rotating system of the geared compressor with small torque, and the operator can also easily perform fine manual adjustment of the phase or the like. In such manner, it is possible to adjust the phase of the rotating system easily and with high accuracy.

In addition, according to a second aspect of the present invention, in the phase adjustment system for a geared compressor, the main jig gear may be disposed above the drive gear in a vertical direction in a state where the frame is fixed to the gear casing.

With such configuration, owing to the own weight of the phase adjustment jig, the main jig gear and the drive gear can reliably mesh with each other.

In addition, according to a third aspect of the present invention, in the second aspect, the phase adjustment system for a geared compressor may further include a guide protrusion portion that is provided in one of the gear casing and the frame to protrude toward the other of the gear casing and the frame; and an insertion hole which is formed in the other of the gear casing and the frame and into which the guide protrusion portion is insertable.

With such configuration, it is possible to easily and reliably position the frame with respect to the gear casing in a horizontal direction. Therefore, the position of the main jig gear can be accurately disposed with respect to the drive gear in the horizontal direction, and the main jig gear can reliably mesh with the drive gear.

In addition, a fourth aspect of the present invention provides the phase adjustment system for a geared compressor according to any one of the first to third aspects, in which the phase adjustment jig may include an auxiliary jig gear that is configured to reduce a rotation speed of the handle to transmit the reduced rotation speed to the main jig gear.

With such configuration, it is possible to rotate the drive gear with larger torque compared to the torque to actually rotate the handle. Therefore, an operator can rotate the drive gear with a smaller force. Accordingly, it is possible to adjust the phase of a rotating system more easily and with higher accuracy.

In addition, according to a fifth aspect of the present invention, there is provided a phase adjustment jig for a geared compressor which is configured to adjust phases of gears in a geared compressor including a rotation drive portion, a drive shaft configured to be rotated by the rotation drive portion, a gear train configured to be rotated by the drive shaft and including the gears that are provided to mesh with each other, a gear casing accommodating the gear train, a driven shaft that is configured to rotate by a rotation of the gear train, and a compression portion provided in an end portion of the driven shaft and configured to rotate together with the driven shaft to compress a fluid, in which as the gears, the geared compressor includes a drive gear that is fixed to the drive shaft and has a largest outer diameter, and a driven gear that has a smaller diameter than a diameter of the drive gear to mesh with the drive gear and is fixed to the driven shaft, the phase adjustment jig including a frame that is attachable to and detachable from the gear casing; a main jig gear that is rotatably provided with respect to the frame and meshes with the drive gear in a state where the frame is fixed to the gear casing; and a handle that is configured to rotate the main jig gear.

In addition, according to a sixth aspect of the present invention, there is provided a method for adjusting a phase of a geared compressor which is configured to adjust phases of gears in a geared compressor including a rotation drive portion, a drive shaft configured to be rotated by the rotation drive portion, a gear train configured to be rotated by the drive shaft and including the gears that are provided to mesh with each other, a gear casing accommodating the gear train, a driven shaft that is configured to rotated by a rotation of the gear train, and a compression portion provided in an end portion of the driven shaft and configured to rotate together with the driven shaft to compress a fluid, in which as the gears, the geared compressor includes a drive gear that is fixed to the drive shaft and has a largest outer diameter, and a driven gear that has a smaller diameter than a diameter of the drive gear to mesh with the drive gear and is fixed to the driven shaft, the method including a preparation step of preparing a phase adjustment jig including a frame that is attachable to and detachable from the gear casing, a main jig gear that is rotatably provided with respect to the frame and meshes with the drive gear in a state where the frame is fixed to the gear casing, and a handle that is configured to rotate the main jig gear; a jig attachment step of fixing the frame of the phase adjustment jig to the gear casing to cause the main jig gear to mesh with the drive gear; and a phase adjustment step of adjusting the phases of the gears by rotating the handle to rotate the plurality of gears via the main jig gear.

According to the present invention, it is possible to adjust the phase of the rotating system easily and with high accuracy.

DETAILED DESCRIPTION OF THE INVENTION

Hereinafter, a phase adjustment system for a geared compressor, a phase adjustment jig for a geared compressor, and a method for adjusting the phase of a geared compressor according to an embodiment of the present invention will be described with reference to the accompanying drawings. However, the present invention is not limited only to this embodiment.

Figure 1:
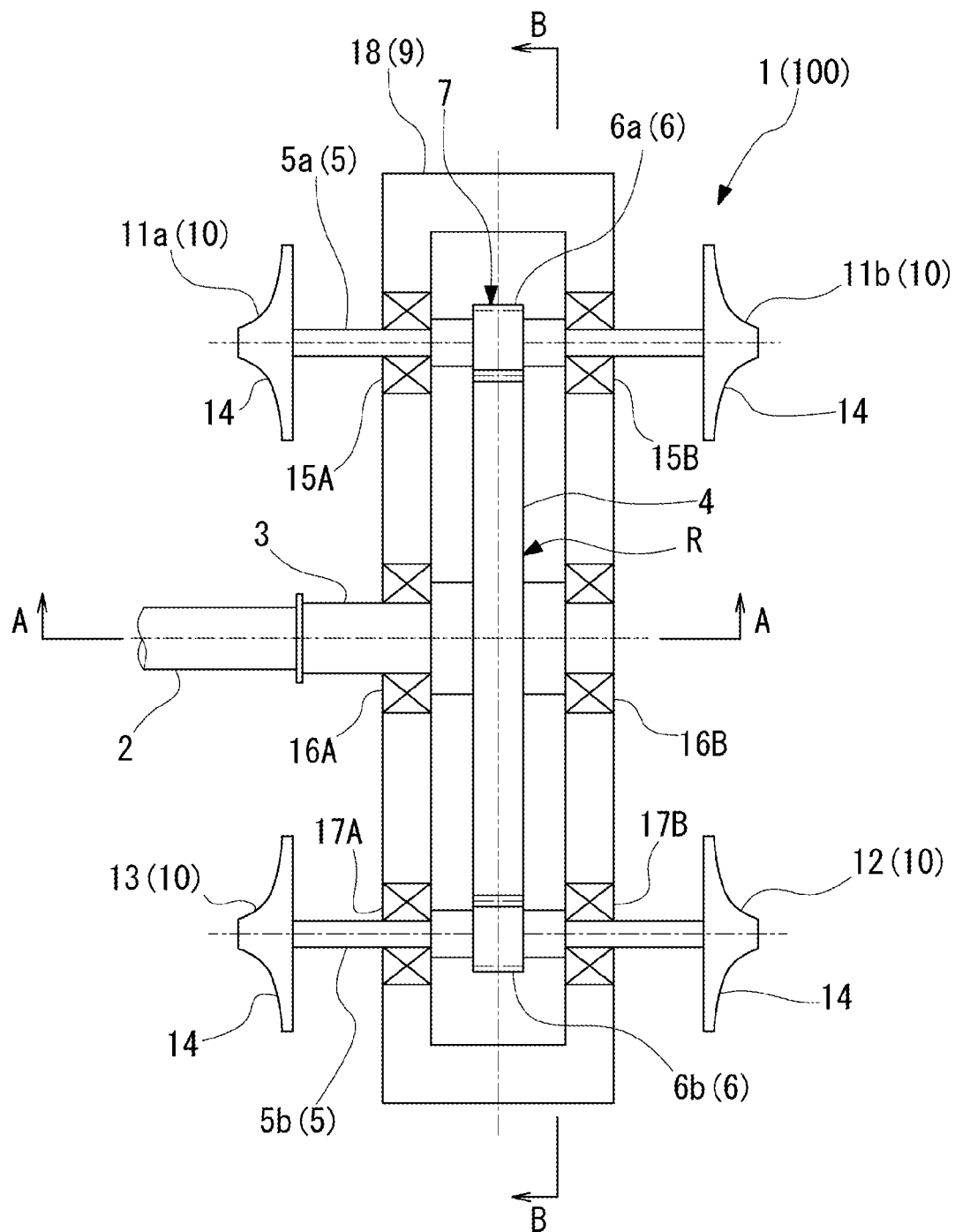
FIG. 1 is a plan view that schematically shows the configuration of a geared compressor forming a phase adjustment system for a geared compressor according to an embodiment of the present invention.
Figure 2:
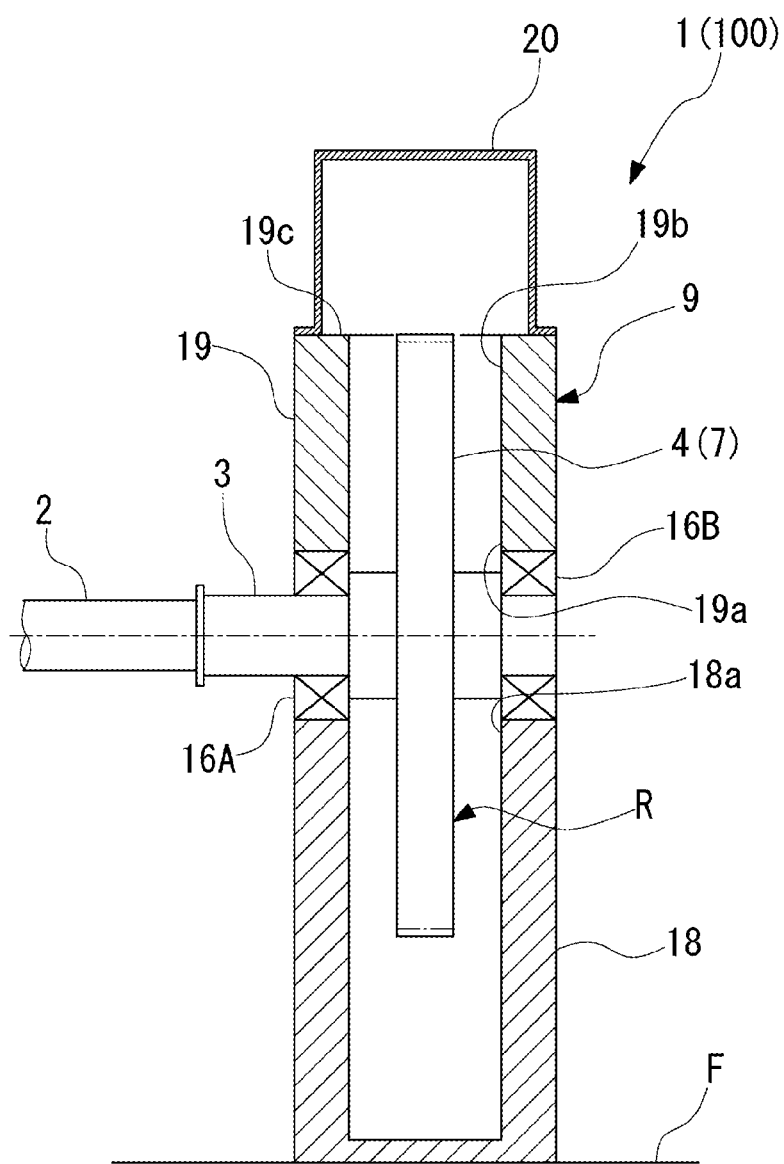
FIG. 2 is a view showing the configuration of the geared compressor, and is a cross-sectional view taken along a line A-A in FIG. 1.
Figure 3:
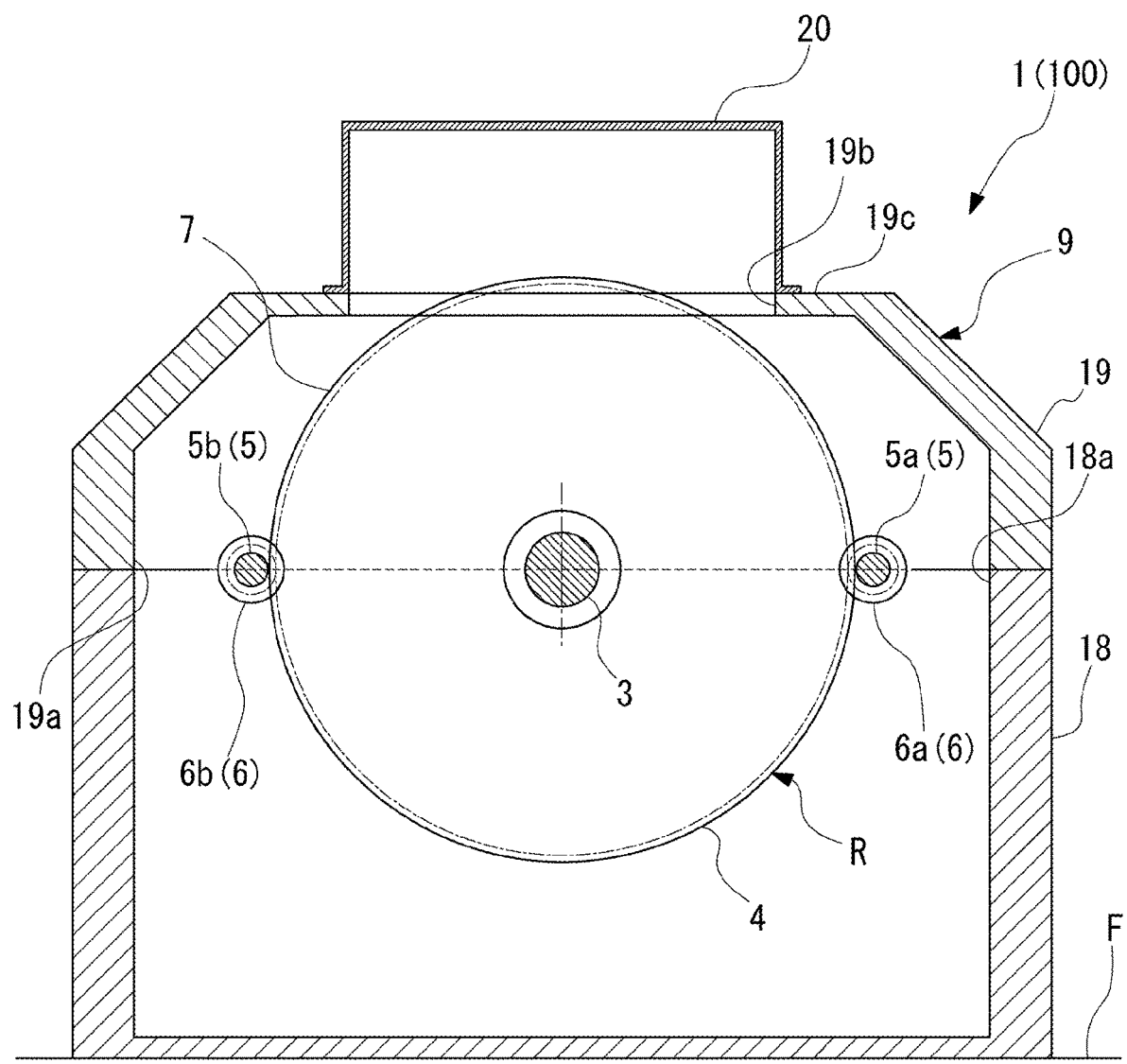
FIG. 3 is a view showing the configuration of the geared compressor, and is a cross-sectional view taken along a line B-B in FIG. 1.

FIG. 1 is a plan view that schematically shows the configuration of a geared compressor forming the phase adjustment system for a geared compressor according to the embodiment of the present invention. FIG. 2 is a view showing the configuration of the geared compressor, and is a cross-sectional view taken along a line A-A in FIG. 1. FIG. 3 is a view showing the configuration of the geared compressor, and is a cross-sectional view taken along a line B-B in FIG. 1.

As shown in FIG. 1, a geared compressor 1 of the embodiment includes a plurality of gears. The geared compressor 1 with a multi-axis and multi-stage configuration rotates a plurality of impellers 14 and compresses a fluid by rotating the plurality of gears. The geared compressor 1 includes a rotation drive portion 2; a drive shaft 3; a gear train 7; two driven shafts 5; a gear casing 9; and a compression portion 10.

As shown in FIGS. 1 and 2, the drive shaft 3 is rotated around the axis thereof extending in a horizontal direction by the rotation drive portion 2 which is a driving source. The rotation drive portion 2 generates power for driving the geared compressor 1. For example, a motor such as an electric motor, or a steam turbine can be adopted as the rotation drive portion 2. The drive shaft 3 penetrates through the gear casing 9 to be described later such that a tip end of the drive shaft 3 is disposed in the gear casing 9.

The gear train 7 includes the plurality of gears that are provided to mesh with each other. The gear train 7 serves as a step-up gear that steps up the rotation of the drive shaft 3 to transmit the stepped up rotation to the driven shaft 5 to be described later. As shown in FIGS. 1 and 3, the gear train 7 of the embodiment includes a drive gear 4 and two driven gears 6.

The drive gear 4 is fixed to a tip end portion of the drive shaft 3 in the gear casing 9. The drive gear 4 has a larger outer diameter and the larger number of teeth than those of the two driven gears 6. Namely, the drive gear 4 is a gear with the largest outer diameter among the plurality of gears in the gear train 7.

The two driven gears 6 mesh with and are driven by the drive gear 4. The two driven gears 6 are disposed on both sides of the drive gear 4 to interpose the drive gear 4 (the drive shaft 3) therebetween. Both of the two driven gears 6 have a smaller diameter and the smaller number of teeth than those of the drive gear 4. Namely, the driven gear 6 is a gear with the smallest outer diameter among the plurality of gears in the gear train 7. The two driven gears 6 are formed of a first driven gear 6a and a second driven gear 6b.

The two driven shafts 5 are fixed to the driven gears 6 to serve as the shafts of the driven gears 6. As the driven gears 6 to which the rotation of the drive gear 4 is transmitted rotates, the two driven shafts 5 rotate around the central axes of the two driven shafts 5. The driven shaft 5 penetrates through the gear casing 9 such that both ends of the driven shaft 5 are positioned outside the gear casing 9. The two driven shafts 5 include a first driven shaft 5a fixed to the first driven gear 6a, and a second driven shaft 5b fixed to the second driven gear 6b. The first driven gear 6a and the second driven gear 6b extend parallel to the drive shaft 3.

As shown in FIG. 1, the compression portion 10 is driven by power transmitted to the two driven shafts 5. The compression portion 10 includes two first stage compression portions 11a and 11b, a second stage compression portion 12, and a third stage compression portion 13. The first stage compression portions 11a and 11b are provided at both ends of the first driven shaft 5a. The two first stage compression portions 11a and 11b have the same configuration. The second stage compression portion 12 is provided at a first end of the second driven shaft 5b. The third stage compression portion 13 is provided at a second end of the second driven shaft 5b, the second end being opposite to the second stage compression portion 12.

The first stage compression portions 11a and 11b, the second stage compression portion 12, and the third stage compression portion 13 compress a working fluid by using the impellers 14. The first stage compression portions 11a and 11b include first impellers 14a and 14b. The impeller 14 compresses the supplied working fluid via a flow path that is formed inside the impeller 14. The first stage compression portions 11a and 11b, the second stage compression portion 12, and the third stage compression portion 13 are connected to each other in order via pipes (not shown).

In the compression portion 10, the working fluid to be compressed is introduced in order of the first stage compression portions 11a and 11b, the second stage compression portion 12, and the third stage compression portion 13, and is sequentially compressed. After the working fluid is compressed in the third stage compression portion 13, the working fluid is supplied to a demander (not shown) of the compressed working fluid.

As shown in FIGS. 2 and 3, the gear train 7 is accommodated inside the gear casing 9. Namely, the drive gear 4 and the driven gear 6 are accommodated inside the gear casing 9. The drive shaft 3, the first driven shaft 5a, and the second driven shaft 5b are rotatably supported on the gear casing 9. Specifically, the drive shaft 3 is rotatably supported on the gear casing 9 via bearings 16A and 16B. The first driven shaft 5a is rotatably supported on the gear casing 9 via bearings 15A and 15B. The second driven shaft 5b is rotatably supported on the gear casing 9 via bearings 17A and 17B. The gear casing 9 includes a lower casing 18; an upper casing 19; and a cover 20.

The lower casing 18 is fixed to an installation surface F of a floor or the like of a factory. The lower casing 18 opens upward, and includes a first recess portion 18a that is recessed downward. Lower portions of the drive gear 4 and a plurality of the driven gears 6 are accommodated inside the first recess portion 18a.

The upper casing 19 is fixed onto the lower casing 18 with bolts (not shown) or the like. The upper casing 19 includes a second recess portion 19a that is recessed upward. Upper portions of the drive gear 4 and the plurality of driven gears 6 are accommodated inside the second recess portion 19a. Namely, in the gear casing 9, a space which accommodates the gear train 7 is formed by the first recess portion 18a of the lower casing 18 and the second recess portion 19a of the upper casing 19.

In addition, an upper opening 19b is formed in a casing top plate portion 19c forming an upper portion of the upper casing 19. The upper opening 19b is formed as a through hole which penetrates through the casing top plate portion 19c such that at least a part of the upper portion of the drive gear 4 is exposed. The casing top plate portion 19c has a planar shape which widens in the horizontal direction.

The cover 20 is provided on the upper casing 19 to block the upper opening 19b. The cover 20 is detachably provided on the casing top plate portion 19c with bolts (not shown).

Figure 4:
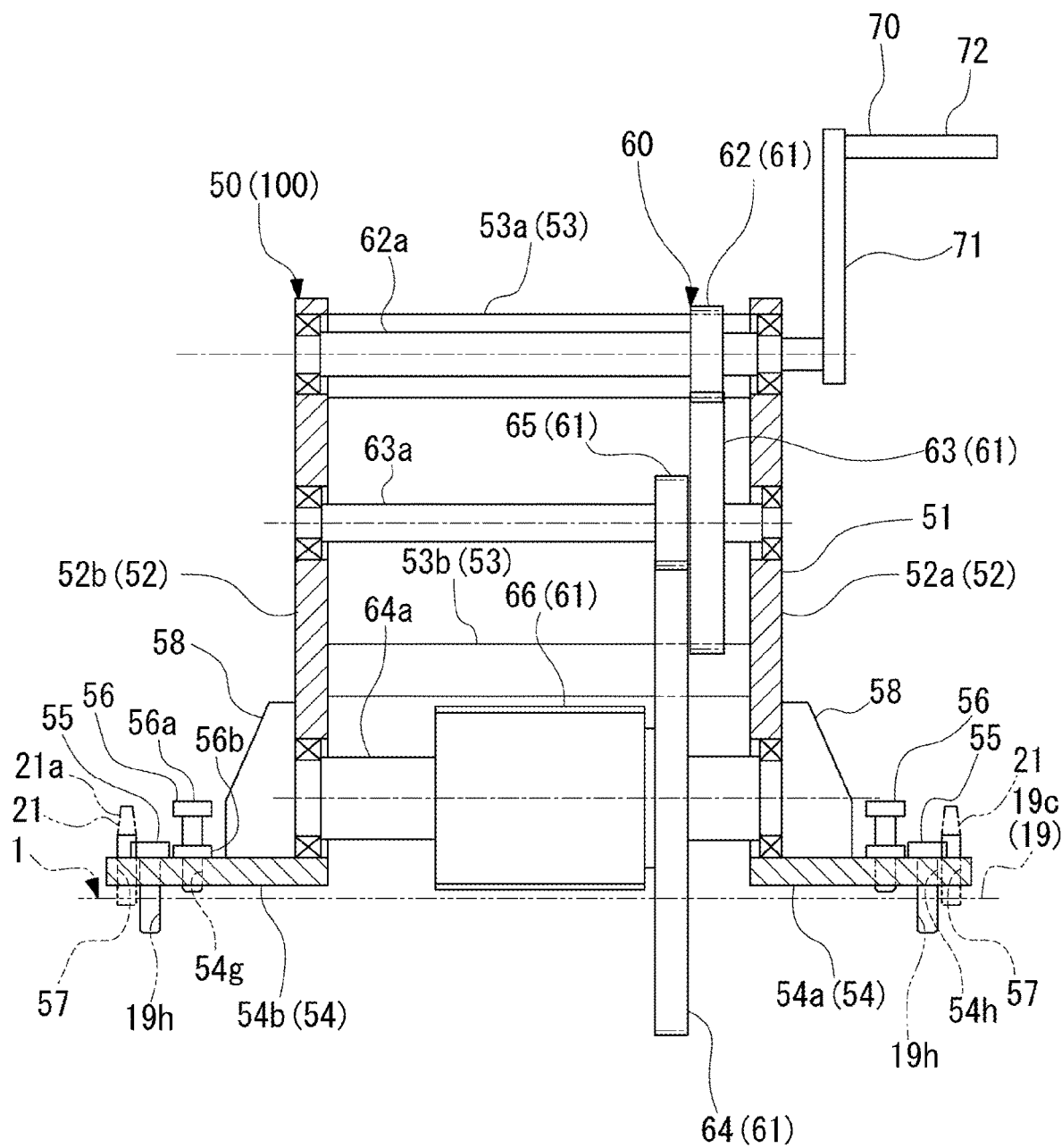
FIG. 4 is a cross-sectional view showing the configuration of a phase adjustment jig forming the phase adjustment system for a geared compressor according to the embodiment of the present invention.
Figure 5:
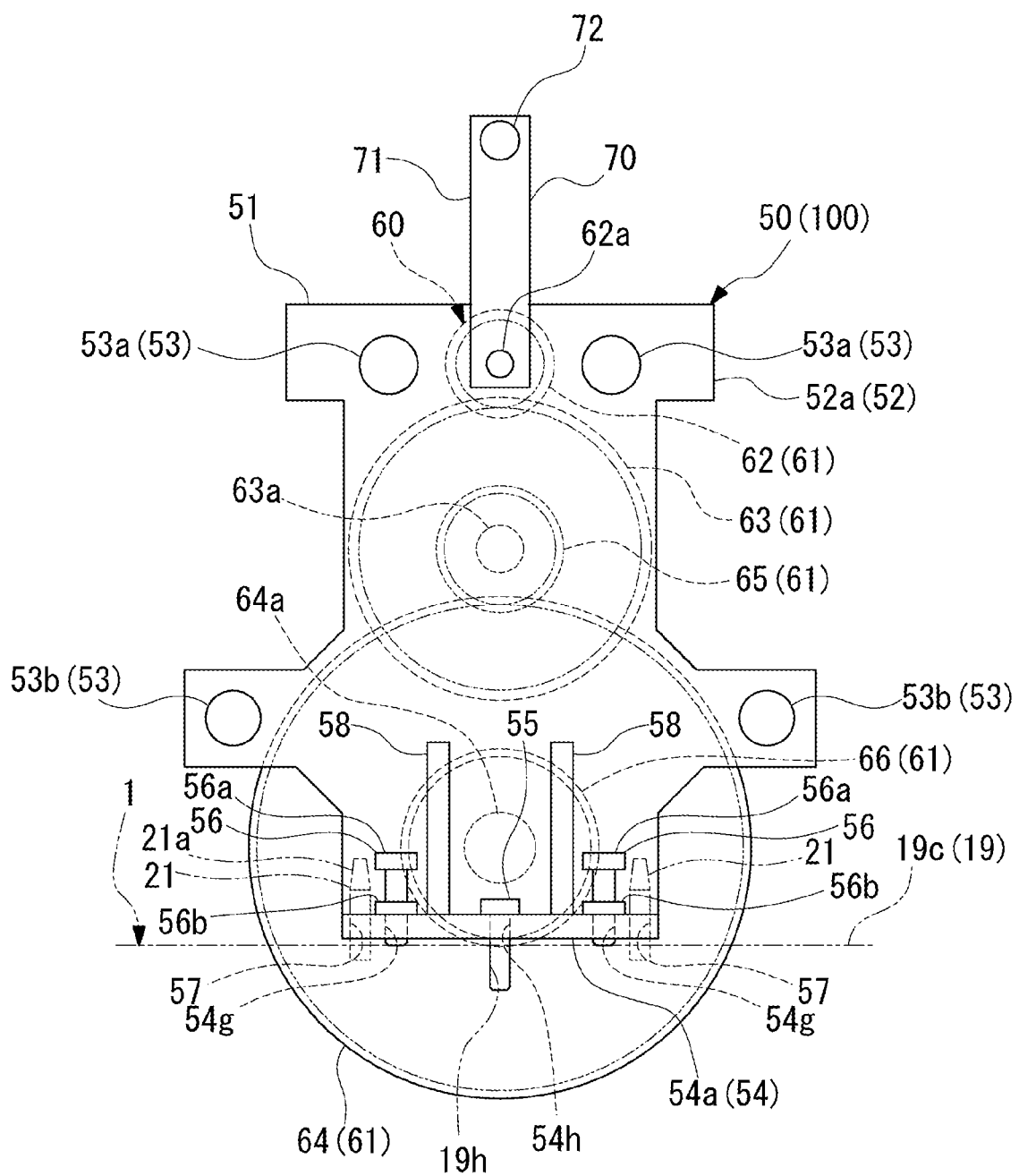
FIG. 5 is a side view showing the configuration of the phase adjustment jig.

FIG. 4 is a cross-sectional view showing the configuration of a phase adjustment jig forming the phase adjustment system for a geared compressor according to the embodiment of the present invention. FIG. 5 is a side view showing the configuration of the phase adjustment jig. A phase adjustment system 100 for the geared compressor 1 in the embodiment includes the geared compressor 1 described above, and a phase adjustment jig 50 shown in FIGS. 4 and 5.

The phase adjustment jig 50 enables an operator to manually adjust the phases of the plurality of gears from outside the gear casing 9. The phase adjustment jig 50 is to be provided detachably with respect to the gear casing 9. The phase adjustment jig 50 includes a frame 51; a gear portion 60; and a manually rotatable handle (handle) 70. The phase adjustment jig 50 is attachable onto the upper casing 19 in a state where the cover 20 is removed from the gear casing 9, to cover the upper opening 19b.

The frame 51 is attachable to and detachable from the upper casing 19. The frame 51 includes a side plate 52; a connection shaft 53; a base plate 54; a fixing bolt 55; a height adjustment member 56; and a positioning hole (insertion hole) 57.

The side plate 52 includes a first side plate 52a and a second side plate 52b. In a state where the frame 51 is fixed to the upper casing 19, the first side plate 52a and the second side plate 52b are disposed parallel to each other with a gap therebetween in the horizontal direction. The first side plate 52a and the second side plate 52b have a planar shape. The widest surfaces of the first side plate 52a and the second side plate 52b widen in a vertical direction in a state where the frame 51 is fixed to the upper casing 19.

The connection shaft 53 connects the first side plate 52a to the second side plate 52b. The connection shaft 53 includes an upper connection shaft 53a and a lower connection shaft 53b. The upper connection shaft 53a includes a pair of two upper connection shafts, and extends in a direction where the first side plate 52a and the second side plate 52b face each other. The upper connection shaft 53a connects an upper region of the first side plate 52a to an upper region of the second side plate 52b in a state where the frame 51 is fixed to the upper casing 19. The lower connection shaft 53b includes a pair of two lower connection shafts, and extends parallel to the upper connection shaft 53a. The lower connection shaft 53b is positioned below the upper connection shaft 53a to connect the first side plate 52a to the second side plate 52b in a state where the frame 51 is fixed to the upper casing 19.

The base plate 54 is integrally formed in a lower end portion of the side plate 52. The base plate 54 has a planar shape to widen in the direction where the first side plate 52a and the second side plate 52b face each other. The base plate 54 includes a first base plate 54a and a second base plate 54b. The first base plate 54a is connected to the first side plate 52a to orthogonally extend from a lower end portion of the first side plate 52a. Namely, the first base plate 54a is integrated with the first side plate 52a such that an L shape is formed. The second base plate 54b is connected to the second side plate 52b to orthogonally extend from a lower end portion of the second side plate 52b. Namely, the second base plate 54b is integrated with the second side plate 52b such that an L shape is formed. A reinforcement rib plate 58 is provided in each of a connection portion between the first side plate 52a and the first base plate 54a and a connection portion between the second side plate 52b and the second base plate 54b.

The fixing bolt 55 is a fixing member that detachably fixes the base plate 54 to the upper casing 19. The fixing bolt 55 is inserted into a bolt insertion hole 54h that is formed in each of the first base plate 54a and the second base plate 54b. The fixing bolt 55 is fastened to a female screw hole 19h that is formed in the casing top plate portion 19c.

The height adjustment member 56 can adjust the position of the base plate 54 with respect to the upper casing 19 in the vertical direction. A plurality of the height adjustment members 56 are provided in the base plate 54. The height adjustment member 56 includes an adjustment bolt 56a and a nut 56b. The adjustment bolt 56a is inserted into a through hole 54g that is formed in each of the first base plate 54a and the second base plate 54b. The nut 56b are mounted on the adjustment bolts 56a on upper surfaces of the first base plate 54a and the second base plate 54b. A lower end of the adjustment bolt 56a is in contact with an upper surface of the casing top plate portion 19c. Since the lower end of the adjustment bolt 56a is in contact with the upper surface of the casing top plate portion 19c, the position of the base plate 54 in the vertical direction is defined. The height of the base plate 54 is adjusted by adjusting the protrusion dimension of the adjustment bolt 56a, which protrudes downward from the base plate 54, with the position of the nut 56b.

The positioning holes 57 are formed at a plurality of locations in the base plate 54. The positioning hole 57 penetrates through the base plate 54 in the vertical direction. A guide protrusion portion 21 is inserted into each of the positioning holes 57. The guide protrusion portion 21 is provided to protrude upward from the casing top plate portion 19c in the vertical direction. The outer diameter of the guide protrusion portion 21 is slightly smaller than the inner diameter of the positioning hole 57. A tapered portion 21a, of which the outer diameter dimension is gradually reduced upward, is formed in an upper end portion of the guide protrusion portion 21. The base plate 54 is positioned in the horizontal direction along the surface of the casing top plate portion 19c by inserting the guide protrusion portion 21 into the positioning hole 57.

The gear portion 60 includes a plurality of jig gears 61. The plurality of jig gears 61 include a first jig gear (auxiliary jig gear) 62; a second jig gear (auxiliary jig gear) 63; a third jig gear (auxiliary jig gear) 64; a fourth jig gear (auxiliary jig gear) 65; and a fifth jig gear (main jig gear) 66.

The first jig gear 62 is fixed to a first jig rotary shaft 62a. The first jig rotary shaft 62a extends in the direction where the first side plate 52a and the second side plate 52b face each other. End portions of the first jig rotary shaft 62a are rotatably supported on the first side plate 52a and the second side plate 52b.

The second jig gear 63 is disposed below the first jig gear 62 in the vertical direction in a state where the phase adjustment jig 50 is fixed to the gear casing 9. The second jig gear 63 is rotatable in a state where the second jig gear 63 meshes with the first jig gear 62. The second jig gear 63 has a larger outer diameter and the larger number of teeth than those of the first jig gear 62. The second jig gear 63 is fixed to a second jig rotary shaft 63a. The second jig rotary shaft 63a extends parallel to the first jig rotary shaft 62a. End portions of the second jig rotary shaft 63a are rotatably supported on the first side plate 52a and the second side plate 52b.

Furthermore, the fourth jig gear 65 having a smaller diameter and the smaller number of teeth than those of the second jig gear 63 is fixed to the second jig rotary shaft 63a. Namely, the fourth jig gear 65 is fixed coaxially with the second jig gear 63.

The third jig gear 64 is disposed below the fourth jig gear 65 in the vertical direction in a state where the phase adjustment jig 50 is fixed to the gear casing 9. The third jig gear 64 meshes with the fourth jig gear 65. The third jig gear 64 has a larger outer diameter and the larger number of teeth than those of the second jig gear 63 and the fourth jig gear 65. The third jig gear 64 is fixed to a third jig rotary shaft 64a. The third jig rotary shaft 64a extends parallel to the first jig rotary shaft 62a. End portions of the third jig rotary shaft 64a are rotatably supported on the first side plate 52a and the second side plate 52b.

Furthermore, the fifth jig gear 66 having a smaller diameter and the smaller number of teeth than those of the third jig gear 64 is fixed to the third jig rotary shaft 64a. Namely, the fifth jig gear 66 is fixed coaxially with the third jig gear 64. The fifth jig gear 66 meshes with the drive gear 4 in a state where the phase adjustment jig 50 is fixed to the gear casing 9. Namely, the fifth jig gear 66 is disposed above the drive gear 4 in the vertical direction in a state where the phase adjustment jig 50 is fixed to the gear casing 9.

The gear portion 60 reduces the rotation speed of the manually rotatable handle 70 to transmit the reduced rotation speed to the fifth jig gear 66 via the plurality of jig gears 61 (the first jig gear 62, the second jig gear 63, the third jig gear 64, and the fourth jig gear 65) having different sizes and the numbers of teeth as described above.

The manually rotatable handle 70 rotates the first jig rotary shaft 62a. The manually rotatable handle 70 is fixed to the first jig rotary shaft 62a outside the first side plate 52a (on a side opposite to a side where the first jig gear 62 is disposed with respect to the first side plate 52a). The manually rotatable handle 70 includes an arm 71 and a handle grip 72.

A base end portion of the arm 71 is connected to the end portion of the first jig rotary shaft 62a. The arm 71 extends outward from the end portion of the first jig rotary shaft 62a in a radial direction of the first jig rotary shaft 62a.

The handle grip 72 is connected to a tip end portion of the arm 71, the tip end portion being opposite to the base end portion of the arm 71. The handle grip 72 extends outward with respect to the first side plate 52a, specifically, extends opposite to a side where the first jig rotary shaft 62a is disposed with respect to the arm 71. The handle grip 72 has a bar shape parallel to the first jig rotary shaft 62a. The handle grip 72 has such size that the operator can grip the handle grip 72.

When the operator rotates the arm 71 around the first jig rotary shaft 62a while holding the handle grip 72, the manually rotatable handle 70 rotates the first jig rotary shaft 62a. When the first jig rotary shaft 62a rotates around the central axis of thereof, the first jig gear 62 rotates simultaneously. As a result, via the second jig gear 63 meshing with the first jig gear 62, the rotation of the first jig gear 62 is transmitted to the second jig gear 63 and the second jig rotary shaft 63a rotates. The rotation of the second jig rotary shaft 63a rotates the fourth jig gear 65. When the fourth jig gear 65 rotates, via the third jig gear 64 meshing with the fourth jig gear 65, the rotation of the fourth jig gear 65 is transmitted to the third jig gear 64 and the third jig rotary shaft 64a rotates. The rotation of the third jig rotary shaft 64a rotates the fifth jig gear 66.

Figure 6:
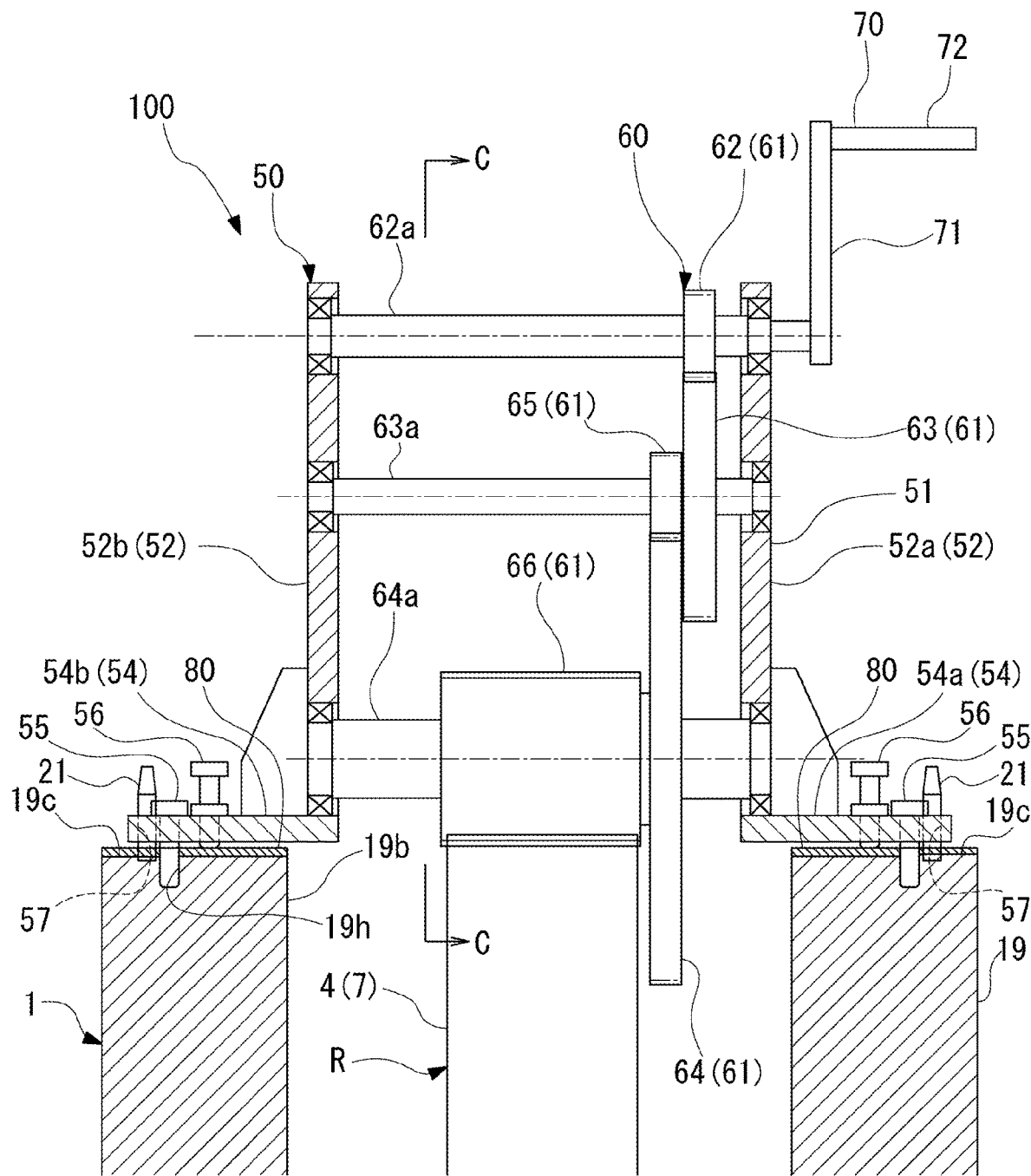
FIG. 6 is a cross-sectional view showing a state where the phase adjustment jig is mounted on the geared compressor in the phase adjustment system for a geared compressor.
Figure 7:
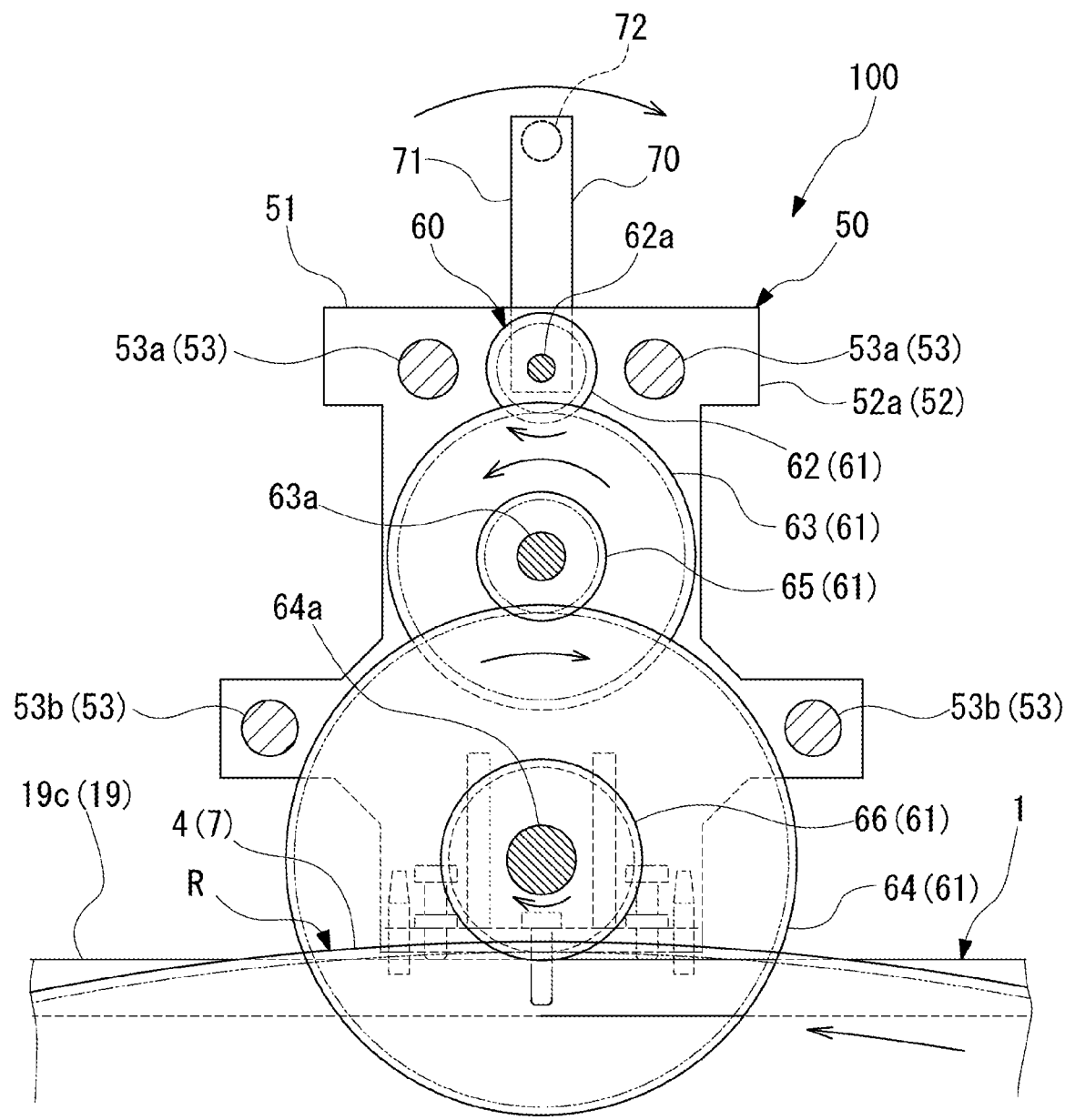
FIG. 7 is a view showing a state where the phase adjustment jig is mounted on the geared compressor in the phase adjustment system for a geared compressor, and is a cross-sectional view taken along a line C-C in FIG. 6.

FIG. 6 is a cross-sectional view showing a state where the phase adjustment jig is mounted on the geared compressor in the phase adjustment system for a geared compressor. FIG. 7 is a view showing a state where the phase adjustment jig is mounted on the geared compressor in the phase adjustment system for a geared compressor, and is a cross-sectional view taken along a line C-C in FIG. 6.

As shown in FIGS. 6 and 7, the phase adjustment jig 50 is installed to cover the upper opening 19b of the upper casing 19. In this state, the first side plate 52a and the second side plate 52b are disposed on the casing top plate portion 19c to interpose the drive gear 4 therebetween. Accordingly, the first base plate 54a and the second base plate 54b are disposed on both sides of the upper opening 19b to interpose the upper opening 19b therebetween. In that state, the first base plate 54a and the second base plate 54b are fixed to the casing top plate portion 19c with the fixing bolts 55. Accordingly, the phase adjustment jig 50 is mounted on the geared compressor 1. In this case, the fifth jig gear 66 is disposed immediately above the drive gear 4 in the vertical direction. As a result, the fifth jig gear 66 meshes with the drive gear 4 that has the largest outer diameter in the gear train 7.

When the operator rotates the manually rotatable handle 70 in a state where the fifth jig gear 66 meshes with the drive gear 4, the rotation of the manually rotatable handle 70 is transmitted to the drive gear 4 via the fifth jig gear 66. As a result, the drive gear 4 is manually rotated from outside the gear casing 9 by the operator. As the drive gear 4 rotates, the plurality of driven gears 6 meshing with the drive gear 4 rotate. Accordingly, in the geared compressor 1, the drive gear 4, the plurality of driven gears 6, the drive shaft 3, and a plurality of driven shafts 5 (namely, a rotating system R of the geared compressor 1) rotate.

Figure 8:
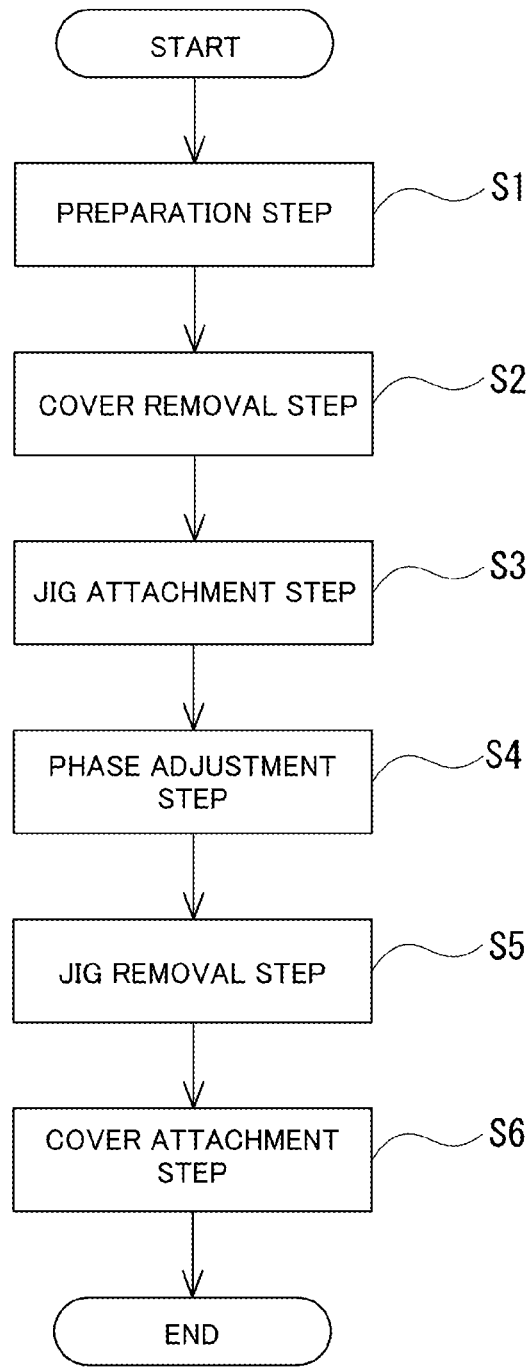
FIG. 8 is a flowchart showing the flow of a method for adjusting the phase of a geared compressor according to the embodiment of the present invention.
Figure 9:
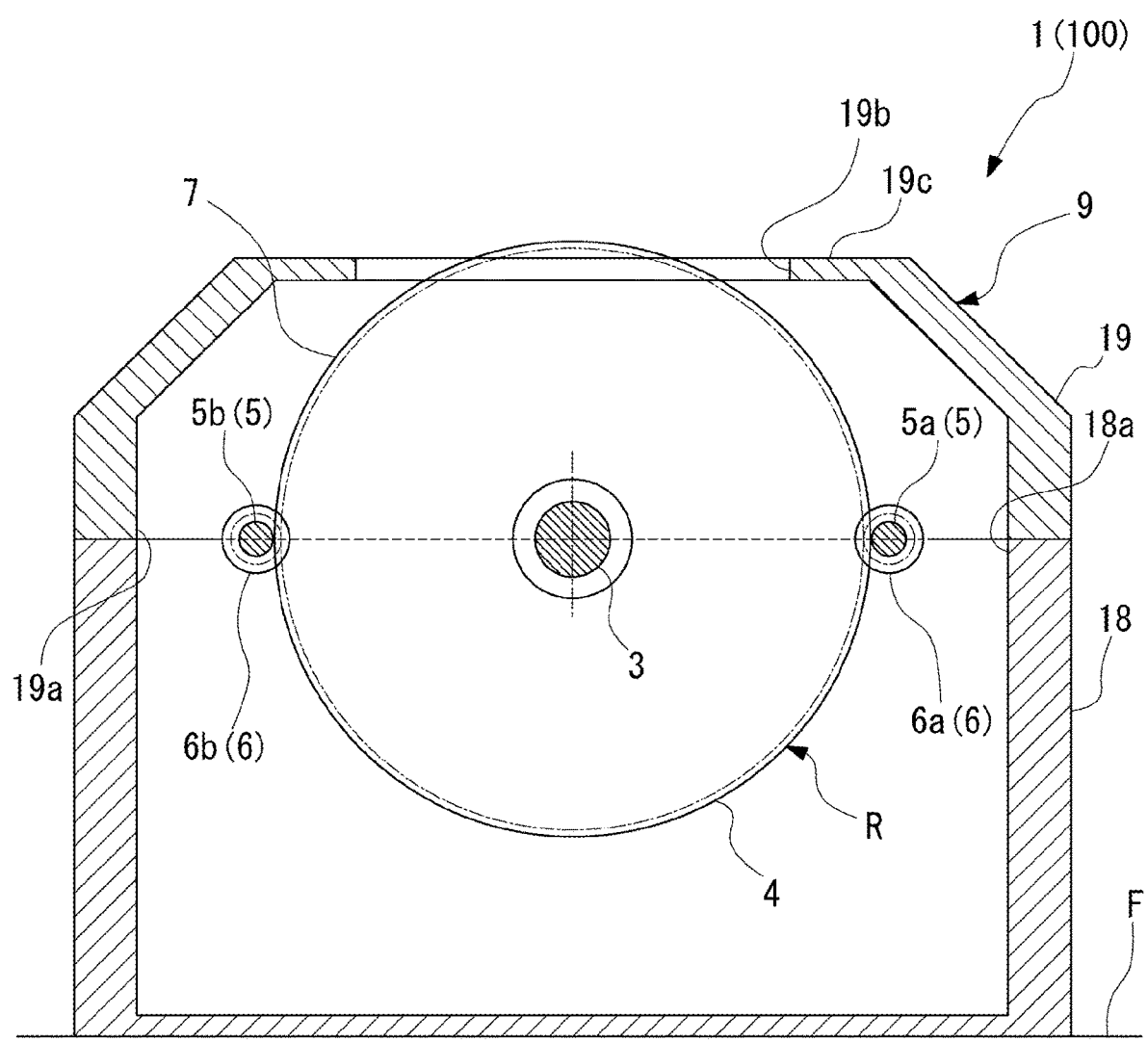
FIG. 9 is a side cross-sectional view showing a state where a cover is removed from the geared compressor.

Subsequently, the method for adjusting the phase of the geared compressor 1 by using the phase adjustment jig 50 will be described. FIG. 8 is a flowchart showing the flow of the method for adjusting the phase of a geared compressor according to the embodiment of the present invention. FIG. 9 is a side cross-sectional view showing a state where the cover is removed from the geared compressor.

The method for adjusting the phase of the geared compressor 1 is a method for adjusting the phase (position in a circumferential direction) of the geared compressor 1, of which the operation stops (or before the operation starts), by rotating the rotating system R thereof from outside. As shown in FIG. 8, the method for adjusting the phase of the geared compressor 1 in the embodiment includes a preparation step S1; a cover removal step S2; a jig attachment step S3; a phase adjustment step S4; a jig removal step S5; and a cover attachment step S6.

In the preparation step S1, the phase adjustment jig 50 is prepared. In the preparation step S1, the phase adjustment jig 50 which is stored at a separate place may be prepared, or the phase adjustment jig 50 may be newly manufactured.

In the cover removal step S2, the cover 20 is removed from the upper casing 19 by unfastening and removing the bolts (not shown) that fix the cover 20. Accordingly, as shown in FIG. 9, the cover 20 is removed from the casing top plate portion 19c, so that the upper opening 19b opens and the upper portion of the drive gear 4 is exposed.

In the jig attachment step S3, the frame 51 of the phase adjustment jig 50 is fixed to the gear casing 9. Specifically, firstly, the frame 51 is suspended and lowered to the gear casing 9 from above in the vertical direction by a machine such as a crane. More specifically, the frame 51 is lowered onto the base plate 54 such that the fifth jig gear 66 meshes with the drive gear 4 from above in the vertical direction. In that case, as shown in FIG. 6, the guide protrusion portion 21 provided in the casing top plate portion 19c is inserted into the positioning hole 57 of the base plate 54. Accordingly, the position of the phase adjustment jig 50 with respect to the gear casing 9 in the horizontal direction becomes a position where the fifth jig gear 66 is disposed above the drive gear 4 in the vertical direction. In this case, as necessary, the protrusion dimension of the adjustment bolt 56a which protrudes downward from the base plate 54 is adjusted with the height adjustment member 56. Accordingly, the height of the base plate 54 with respect to the gear casing 9 is adjusted. Thereafter, the fixing bolt 55 provided in the base plate 54 is fastened to the female screw hole 19h formed in the casing top plate portion 19c. Accordingly, the phase adjustment jig 50 is mounted on the geared compressor 1 in a state where the phase adjustment jig 50 is not movable.

Incidentally, when the base plate 54 is placed on the casing top plate portion 19c, a cover plate 80 may be separately installed such that the cover plate 80 is interposed between the casing top plate portion 19c and the base plate 54. The cover plate 80 can prevent a tip end of the adjustment bolt 56a or the like from causing damage to the upper surface of the casing top plate portion 19c.

In the phase adjustment step S4, the phases of the drive gear 4 and the driven gear 6 are adjusted. Specifically, in the phase adjustment step S4, as shown in FIG. 7, the manually rotatable handle 70 is rotated by an operator. The rotation of the manually rotatable handle 70 is transmitted to the fifth jig gear 66 via from the first jig rotary shaft 62a to the first jig gear 62, the second jig gear 63, the fourth jig gear 65, and the third jig gear 64. Namely, the rotation of the manually rotatable handle 70 is transmitted to the drive gear 4 via the fifth jig gear 66. As a result, the drive gear 4 is rotated from outside the gear casing 9 by the operator. The rotation of the drive gear 4 rotates the drive shaft 3 to which the drive gear 4 is fixed. In addition, as the drive gear 4 rotates, the driven gears 6 meshing with the drive gear 4 rotate. Accordingly, the drive gear 4, the drive shaft 3, the plurality of driven gears 6, and the plurality of driven shafts 5 of the geared compressor 1, namely, the rotating system R of the geared compressor 1 rotate. The phase of the rotating system R is adjusted to a random position by properly adjusting the amount of rotation of the manually rotatable handle 70.

In the jig removal step S5, the phase adjustment jig 50 is removed from the geared compressor 1. In the jig removal step S5, firstly, all of the fixing bolts 55 are removed. In this state, the frame 51 is moved upward with respect to the gear casing 9 in the vertical direction by a crane or the like. As a result, the guide protrusion portion 21 is pulled out of the positioning hole 57 of the base plate 54. Accordingly, the frame 51 can move with respect to the gear casing 9 also in the horizontal direction. As described above, the phase adjustment jig 50 is removed from the geared compressor 1.

In the cover attachment step S6, the cover 20 is attached to the upper casing 19. Specifically, in the cover attachment step S6, as shown in FIGS. 2 and 3, the cover 20 covers the casing top plate portion 19c from above in the vertical direction to block the upper opening 19b. Then, the cover 20 is attached to the casing top plate portion 19c by fastening the bolts (not shown). As described above, the geared compressor 1 of which the adjustment of the phase of the rotating system R is completed enters an operable state again.

According to the phase adjustment system 100 for the geared compressor 1, the phase adjustment jig 50 for the geared compressor 1, and the method for adjusting the phase of the geared compressor 1 which have been described above, the frame 51 is fixed to the gear casing 9, and thus, the fifth jig gear 66 among the jig gears 61 meshes with the drive gear 4. In this state, the fifth jig gear 66 is rotated via from the first jig rotary shaft 62a to the first jig gear 62, the second jig gear 63, the fourth jig gear 65, and the third jig gear 64 by rotating the manually rotatable handle 70. As a result, the rotation of the fifth jig gear 66 is transmitted, and thereby being able to rotate the drive gear 4. Then, the drive gear 4 rotates, and thereby being able to rotate the rotating system R of the geared compressor 1. Therefore, it is possible to adjust the phase of the rotating system R of the geared compressor 1 with the manually rotatable handle 70.

In addition, the fifth jig gear 66 meshes with the drive gear 4 that has the largest outer diameter in the gear train 7. With such configuration, it is possible to rotate the rotating system R of the geared compressor 1 with smaller torque. Therefore, it is possible to adjust the phase of the rotating system R of the geared compressor 1 with small torque, and the operator can also easily perform fine manual adjustment of the phase or the like. In such manner, it is possible to adjust the phase of the rotating system R easily and with high accuracy.

In addition, the fifth jig gear 66 is disposed above the drive gear 4 in the vertical direction. With such configuration, owing to the own weight of the phase adjustment jig 50, the fifth jig gear 66 and the drive gear 4 can reliably mesh with each other. Therefore, it is possible to attach the phase adjustment jig 50 to the geared compressor 1 with high accuracy. Furthermore, in a case where the weight of the phase adjustment jig 50 is large, it is possible to bring the phase adjustment jig 50 into a non-movable state only by placing the phase adjustment jig 50 on the casing top plate portion 19c. Therefore, the phase adjustment jig 50 can be easily attached to and detached from the gear casing 9. Particularly, the larger the weight of the phase adjustment jig 50 is, the more noticeable the effects are. Therefore, compared to a configuration where the phase adjustment jig 50 is mounted on the geared compressor 1 from side such as being mounted on a side surface of the gear casing 9 or the like, it is possible to attach and detach the phase adjustment jig 50 more easily and with higher accuracy.

In addition, the guide protrusion portion 21 formed in the gear casing 9 is inserted into the positioning hole 57 formed in the base plate 54. Accordingly, it is possible to easily and reliably position the frame 51 with respect to the gear casing 9 in the horizontal direction. Therefore, the position of the fifth jig gear 66 can be accurately disposed with respect to the drive gear 4 in the horizontal direction, and the fifth jig gear 66 can reliably mesh with the drive gear 4.

In addition, the phase adjustment jig 50 further includes the height adjustment member 56 that adjusts the position of the frame 51 with respect to the casing top plate portion 19c in the vertical direction. It is possible to adjust the position of the fifth jig gear 66 with respect to the gear casing 9 in a radial direction (vertical direction) of the drive gear 4 by using the height adjustment member 56. Accordingly, it is possible to properly adjust the state of meshing between the fifth jig gear 66 and the drive gear 4.

In addition, the rotation of the first jig gear 62 connected to the manually rotatable handle 70 is transmitted to the fifth jig gear 66 in order of the second jig gear 63, the fourth jig gear 65, and the third jig gear 64 such that the rotation speed is reduced. For this reason, it is possible to rotate the drive gear 4 with larger torque compared to the torque to actually rotate the manually rotatable handle 70. Therefore, the operator can rotate the drive gear 4 with a smaller force. Accordingly, it is possible to adjust the phase of the rotating system R more easily and with higher accuracy.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims. In addition, the present invention is not limited by the embodiment, but is limited by the claims.

For example, in the geared compressor 1 of the embodiment, the number of the compression portions 10 is merely one example. For example, the compression portion may be provided only in one end portion of one driven shaft 5. Furthermore, the number of driven shafts 5 provided with the compression portions 10 is not limited to two, and three or more driven shafts 5 may be provided. Accordingly, the number of the driven gears 6 meshing with the drive gear 4 may increase. In addition, the disposition of the driven gear 6 (driven shaft 5) meshing with the drive gear 4 is not limited at all. For example, the driven gear 6 may be disposed above the drive gear 4 to mesh with the drive gear 4.

Furthermore, the driven gear 6 may not mesh directly with the drive gear 4. An intermediate gear may be disposed between the drive gear 4 and the driven gear 6. Namely, a structure where the rotation of the drive gear 4 is transmitted to the driven gear 6 via the intermediate gear may be adopted. In this case, the gear train 7 is configured to include one or more intermediate gears in addition to the drive gear 4 and the driven gear 6.

In addition, in the embodiment, the phase adjustment jig 50 is placed on the upper casing 19 of the geared compressor 1 in a state where the cover 20 of the geared compressor 1 is removed; however, the present invention is not limited to such structure. The mounting position, the mounting orientation, or the like of the phase adjustment jig 50 can be appropriately changed as long as the jig gear 61 of the phase adjustment jig 50 can mesh with the drive gear 4.

In addition, in the embodiment, the positioning hole (insertion hole) 57 is formed in the base plate 54, and the guide protrusion portion 21 is formed in the gear casing 9; however, the present invention is not limited to such structure. Namely, the guide protrusion portion 21 may be provided in one of the gear casing 9 and the frame 51, and the insertion hole may be provided in the other of the gear casing 9 and the frame 51. Therefore, the guide protrusion portion may be provided in the phase adjustment jig 50, and the insertion hole may be provided in the geared compressor 1. In addition, in a case where it is not necessary to adjust the position of the phase adjustment jig 50 in the horizontal direction (in a case where the operator can visually perform adjustment, or the like), the guide protrusion portion or the insertion hole may not be provided.

Furthermore, in the embodiment, the height adjustment member 56 formed of the adjustment bolt 56a and the nut 56b is used; however, the present invention is not limited to this configuration. As long as a sim, a spacer, or the like can adjust the height of the phase adjustment jig 50, the sim, the spacer, or the like as a height adjustment member may be interposed between the base plate 54 and the casing top plate portion 19*c*. In addition, in a case where it is not necessary to adjust the height of the phase adjustment jig 50, the height adjustment member 56 may not be provided.

EXPLANATION OF REFERENCES

1: Geared compressor
2: Rotation drive portion
3: Drive shaft
4: Drive gear
5: Driven shaft
5*a*: First driven shaft
5*b*: Second driven shaft
6: Driven gear
6*a*: First driven gear
6*b*: Second driven gear
7: Gear train
9: Gear casing
10: Compression portion
11*a*: First stage compression portion
11*b*: First stage compression portion
12: Second stage compression portion
13: Third stage compression portion
14: Impeller
15A, 15B, 16A, 16B, 17A, and 17B: Bearing
18: Lower casing
18*a*: First recess portion
19: Upper casing
19*a*: Second recess portion
19*b*: Upper opening
19*c*: Casing top plate portion
19*h*: Female screw hole
20: Cover
21: Guide protrusion portion
21*a*: Tapered portion
50: Phase adjustment jig
51: Frame
52: Side plate
52*a*: First side plate
52*b*: Second side plate
53: Connection shaft
53*a*: Upper connection shaft
53*b*: Lower connection shaft
54: Base plate
54*a*: First base plate
54*b*: Second base plate
54*g*: Through hole
54*h*: Bolt insertion hole
55: Fixing bolt
56: Height adjustment member
56*a*: Adjustment bolt
56*b*: Nut
57: Positioning hole (insertion hole)
58: Reinforcement rib plate
60: Gear portion
61: Jig gear
62: First jig gear (auxiliary jig gear)
62*a*: First jig rotary shaft
63: Second jig gear (auxiliary jig gear)
63*a*: Second jig rotary shaft
64: Third jig gear (auxiliary jig gear)
64*a*: Third jig rotary shaft
65: Fourth jig gear (auxiliary jig gear)
66: Fifth jig gear (main jig gear)
70: Manually rotatable handle (handle)
71: Arm
72: Handle grip
80: Cover plate
100: Phase adjustment system
F: Installation surface
R: Rotating system
S1: Preparation step
S2: Cover removal step
S3: Jig attachment step
S4: Phase adjustment step
S5: Jig removal step
S6: Cover attachment step

What is claimed is:

1. A phase adjustment system for a geared compressor comprising:
a geared compressor including gears that are provided to mesh with each other; and
a phase adjustment jig configured to be attachable to and detachable from the geared compressor and to adjust phases of the gears,
wherein the geared compressor includes
a rotation drive portion,
a drive shaft configured to be rotated by the rotation drive portion,
a drive gear fixed to the drive shaft and having a largest outer diameter among the gears,
a driven gear having a smaller diameter than a diameter of the drive gear among the gears and meshing with the drive gear,
a gear casing accommodating the drive gear and the driven gear,
a driven shaft fixed to the driven gear, and
a compression portion provided in an end portion of the driven shaft and configured to rotate together with the driven shaft to compress a fluid, and
wherein the phase adjustment jig includes
a frame that is attachable to and detachable from the gear casing,
a main jig gear that is rotatably provided with respect to the frame and meshes with the drive gear in a state where the frame is fixed to the gear casing,
a handle is configured to rotate the main jig gear, and
an auxiliary jig gear that is configured to reduce a rotation speed of the handle to transmit the reduced rotation speed to the main jig gear.

2. The phase adjustment system for a geared compressor according to claim 1, wherein the main jig gear is disposed above the drive gear in a vertical direction in a state where the frame is fixed to the gear casing.

3. The phase adjustment system for a geared compressor according to claim 2, further comprising:
a guide protrusion portion that is provided in one of the gear casing and the frame to protrude toward the other of the gear casing and the frame; and
an insertion hole which is formed in the other of the gear casing and the frame and into which the guide protrusion portion is insertable.

4. The phase adjustment system for a geared compressor according to claim 1, further comprising:
a guide protrusion portion that is provided in one of the gear casing and the frame to protrude toward the other of the gear casing and the frame; and
an insertion hole which is formed in the other of the gear casing and the frame and into which the guide protrusion portion is insertable.

5. A phase adjustment jig for a geared compressor, which is configured to adjust phases of gears in a geared compressor including a rotation drive portion, a drive shaft configured to be rotated by the rotation drive portion, a gear train configured to be rotated by the drive shaft and including the gears that are provided to mesh with each other, a gear casing accommodating the gear train, a driven shaft that is configured to rotate by a rotation of the gear train, and a compression portion provided in an end portion of the driven shaft and configured to rotate together with the driven shaft to compress a fluid, in which as the gears, the geared compressor includes a drive gear that is fixed to the drive shaft and has a largest outer diameter, and a driven gear that has a smaller diameter than a diameter of the drive gear to mesh with the drive gear and is fixed to the driven shaft, the phase adjustment jig comprising:
- a frame that is attachable to and detachable from the gear casing;
- a main jig gear that is rotatably provided with respect to the frame and meshes with the drive gear in a state where the frame is fixed to the gear casing;
- a handle that is configured to rotate the main jig gear; and
- an auxiliary jig gear that is configured to reduce a rotation speed of the handle to transmit the reduced rotation speed to the main jig gear.

6. A method for adjusting a phase of a geared compressor, which is configured to adjust phases of gears in a geared compressor including a rotation drive portion, a drive shaft configured to be rotated by the rotation drive portion, a gear train configured to be rotated by the drive shaft and including the gears that are provided to mesh with each other, a gear casing accommodating the gear train, a driven shaft that is configured to rotate by a rotation of the gear train, and a compression portion provided in an end portion of the driven shaft and configured to rotate together with the driven shaft to compress a fluid, in which as the gears, the geared compressor includes a drive gear that is fixed to the drive shaft and has a largest outer diameter, and a driven gear that has a smaller diameter than a diameter of the drive gear to mesh with the drive gear and is fixed to the driven shaft, the method comprising:
- a preparation step of preparing a phase adjustment jig including a frame that is attachable to and detachable from the gear casing, a main jig gear that is rotatably provided with respect to the frame and meshes with the drive gear in a state where the frame is fixed to the gear casing, a handle that is configured to rotate the main jig gear, and an auxiliary jig gear that is configured to reduce a rotation speed of the handle to transmit the reduced rotation speed to the main jig gear;
- a jig attachment step of fixing the frame of the phase adjustment jig to the gear casing to cause the main jig gear to mesh with the drive gear; and
- a phase adjustment step of adjusting the phases of the gears by rotating the handle to rotate the gears via the main jig gear.

* * * * *